April 14, 1970 E. KATELL 3,506,810

DIGITAL CONTROLLED FUNCTION GENERATOR INCLUDING A PLURALITY OF DIODE SEGMENT GENERATORS CONNECTED IN PARALLEL

Filed Dec. 14, 1966 3 Sheets-Sheet 1

*INVENTOR.*
EMANUEL KATELL

BY [signature]
HIS ATTORNEY

INVENTOR.
EMANUEL KATELL
BY [signature]
HIS ATTORNEY

April 14, 1970 E. KATELL 3,506,810

DIGITAL CONTROLLED FUNCTION GENERATOR INCLUDING A PLURALITY OF DIODE SEGMENT GENERATORS CONNECTED IN PARALLEL

Filed Dec. 14, 1966 3 Sheets-Sheet 3

INVENTOR.
EMANUEL KATELL

BY [signature]

HIS ATTORNEY

United States Patent Office 3,506,810
Patented Apr. 14, 1970

3,506,810
DIGITAL CONTROLLED FUNCTION GENERATOR INCLUDING A PLURALITY OF DIODE SEGMENT GENERATORS CONNECTED IN PARALLEL

Emanuel Katell, Lincroft, N.J., assignor to Electronic Associates Inc., Long Branch, N.J., a corporation of New Jersey Filed Dec. 14, 1966, Ser. No. 611,199
Int. Cl. G06g 7/26
U.S. Cl. 235—150.53 1 Claim

ABSTRACT OF THE DISCLOSURE

A function generator is adapted to be controlled by a digital signal source and includes a plurality of diode segment generators in parallel connection with each having means therein to select a diode orientation, a plurality of biasing means selectable to incrementally bias the diode to different conducting levels which may be either positive or negative relative to the diode orientation and a plurality of resistance means selectable for series connection with the diode to provide incremental increases in the slope of the generated function segment, the respective selections being in accordance with the format of the signals generated by the digital signal source.

This invention relates to a general purpose function generator for employment in analog computation and more particularly to a function generator that may be automatically programmed for the selection of a number of segments and the slopes thereof as well as the number of break-points that are employed to approximate any particular function that is to be generated.

Although electro-mechanical function generators, such as servo driven potentiometers, can be adapted for automatic or remote settings to generate certain types of functions, such function generators have many limitations, not the least of which is the time involved, because of the mechanical nature of the generator, to set and generate a particular function. Furthermore, such electro-mechanical devices cannot be adapted as general purpose generators. Electronic general purpose function generators are usually of a form involving an operational amplifier with variable impedances in the input path to the amplifier or in the feedback thereof such that a particular function may be generated as an output signal upon selected variations of the function transforms as presented by the ratio of the feedback impedance to the input impedance. Various functions of almost any type are obtained from particular diode networks employed either as the feedback impedance or the input impedance with individual diodes of the network appropriately biased to conduct at selected times to generate a particular segment of the function which is then formed of a plurality of such segments. The slope of each individual segment is determined by the ratio of the feedback resistance to the input resistance of the particular branch of the network in which the conducting diode resides and the time at which the diode begins to conduct (the breakpoint) is determined by the voltage level to which the diode is biased relative to the input signal.

In prior art analog computers, diode function generators were provided with contact outlets as part of a patchboard arranagement with the operator adapting the generator to produce a given function by manner in which the various components were selected and plugged together on the patchboard. Such plugging operations are time consuming especially when consideration is given to calibration and program checking and its is desirable to have a system in which the function generator can be quickly set up to provide the particular desired function. This is especially true in situations where particular functions are often employed in given computations. More importantly, analog computers are being increasingly used in combination with digital computers to form a hybrid system wherein the digital computer is employed to, among other things, provided control information to the analog computer to automatically sequence the particular operational modes of the analog computer as well as to select the particular values of the various impedances that define various functions and coefficients thereof for particular analog computations. As was indicated above, prior art analog computers have employed electro-mechanical servo mechanisms for this purpose which are not readily suitable for control by high speed digital computers.

It is, then, an object of the present invention to provide a function generator that may be automatically set up to generate any chosen function.

It is still another object of the present invention to provide an improved function generator to generate a function, the slopes and breakpoints of the segments of which may be automatically selected.

It is still another object of the present invention to provide an improved system for controlling a function generator.

It is still a further object of the present invention to provide an improved system for selecting the slopes and breakpoints of a function to be generated by a function generator.

The present invention is adapted to provide for rapidly setting up functions often used in analog computation. The present invention is also adapted for the rapid setting of particular functions according to a program being sequenced by a digital processor directly tied to the analog system. Thus, the present invention is designed to take advantage, in the latter case, of the capabilities of a hybrid analog digital computation system and, in the former case, for use with any digital control signals such as might be derived from the static or dynamic reading of a punched card or tape.

To adapte a diode function generator for automatic selection of the breakpoints and slopes of the various segments generated to form a particular function, the present invention includes a plurality of biasing means which may be selected singly or in combination to provide the desired bias for each segment generating diode as well as a plurality of resistive elements that may be selected either singly or in combination for connection in the circuit with each diode to select the appropriate slope for the partcular segment being generated with the respective selections being under the control of digital signals. The system of the present invention is further adapted to provide control signals to automatically adapt the system for function generation in various quadrants of the function curve as well as to provide for parallax, that is to say, for the initial value of the output signal for a zero value input signal.

A feature, then, of the present invention resides in a programable function generation system including a plurality of diodes or unidirectional devices adapted to be connected in parallel for the simultaneous generation of separate segments which go to form a particular function curve and in a plurality of selectable voltage bias means that may be individually connected to selected ones of the respective diodes to bias the respective diodes for conduction at different voltage levels as well as a plurality of separate resistive means each of which may be selectively connected in circuit with the respective diodes to generate segments of different slopes. More particularly, a feature of the present invention resides in the various selectable bias and resistive means being adapted for control by digital signals and in means for generating such control signals.

Other objects, advantages and features of the present invention will become more readily apparent from a review of the following specification when taken in conjunction with the drawings wherein.

Figure 1:
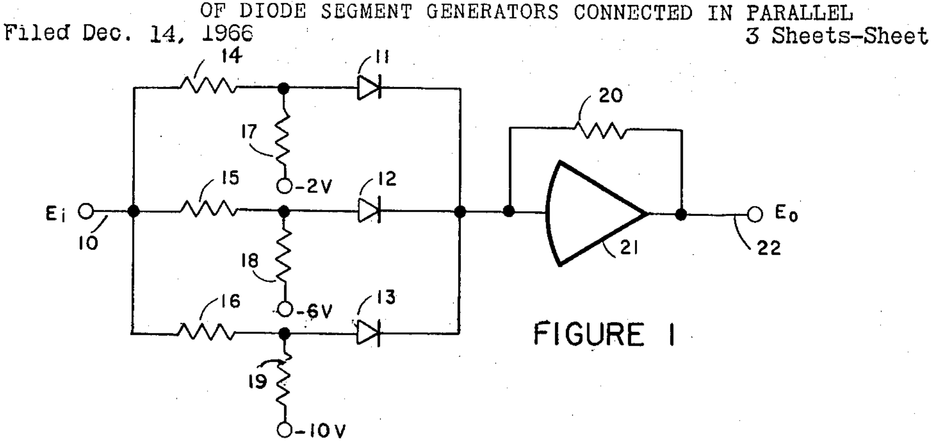
FIGURE 1 is a schematic diagram of a typical diode function generator.
Figures 2, 3:
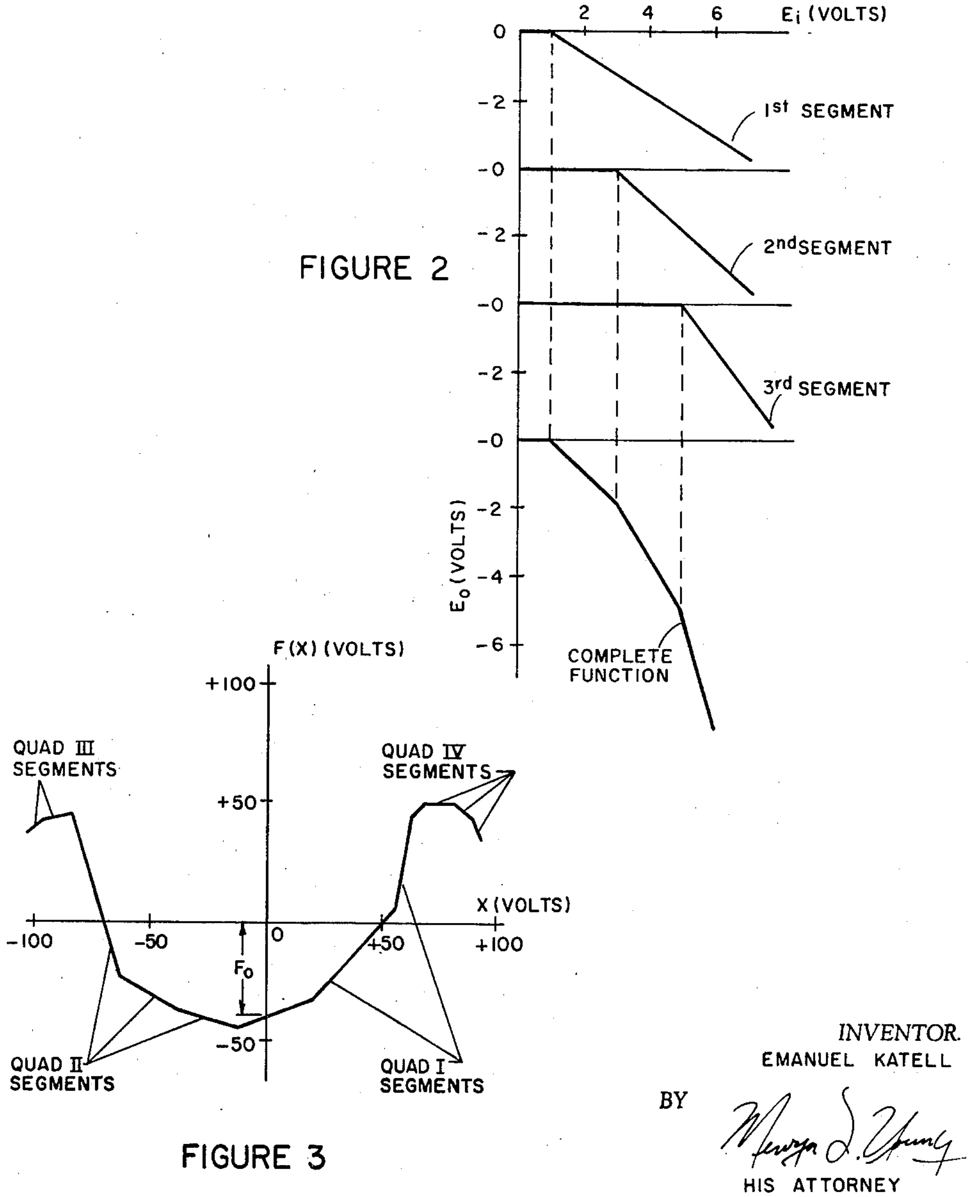
FIGURE 2 is a curve illustrating the operation of the circuit of FIGURE 1.
FIGURE 3 is a curve illustrating the operation of a general diode function generator.

Before giving a detailed description of the present invention, reference is first made to FIGURE 1 which illustrates a typical diode function generator such as might be patched together in a standard analog computer. This particular circuit is formed of three segments in parallel each of which includes a diode in series with a resistor with the junction between the diode and the resistor being coupled to an appropriate bias voltage and this network is coupled between input signal terminal 10 and operational amplifier 21 having resistor 20 in the feedback path such that the output signal will be inverted in sign or polarity as will be understood by those skilled in the art. Diode 11 is illustrated in FIGURE 1 as having its anode biased through resistor 17 to a —2 volt reference voltage and through resistor 14 to input terminal 10. Resistor 17 is chosen to have a value twice that of resistor 14 such that the common junction between the two will be at a negative voltage level for any input signal less than one volt and thus diode 11 will be biased to non-conductance. When the input signal at terminal 10 is greater than 1 volt, diode 11 will be placed in conductance with the resulting output signal at terminal 22 being proportional to the input signal by a factor equal to the ratio between resistance 20 and resistance 14. The generation of this segment of the output signal is illustrated in FIGURE 2. Similarly, diode 12 has its anode coupled through resistor 18 to a minus 6 volt reference level and through resistor 15 to input terminal 10 where the value of resistor 18 is twice that of resistor 16 such that diode 12 is biased in non-conductance for any input signal less than 3 volts. When the input signal is greater than 3 volts, diode 12 will be placed in conductance to provide a second segment of the output function at terminal 22. In a similar manner, diode 13 has its anode coupled through resistor 19 to a minus 10 volt reference source through resistor 16 to input terminal 10 where the value of resistor 19 is twice the value of resistor 16 such that diode 13 is biased to non-conductance for any input voltage less than 5 volts. When the input voltage is greater than 5 volts, diode 13 will be placed in conductance to generate the third segment of the output function with the three segments being summed together at the input junction of operational amplifier 21. As illustrated in FIGURE 2, the slope of each segment is proportional to the ratio between feedback resistor 20 and the respective input resistance in each branch of the diode network. The resultant output signal appearing at terminal 22 will then just be the sum of the various segments as illustrated in FIGURE 2.

It will be observed from the various curves of FIGURE 2 that the circuitry as illustrated in FIGURE 1 generates a curve formed of various segments all of which have a decreasing slope for a positive increasing input signal. It will be appreciated that it is also desirable to have a general purpose function generator that can provide an output signal having an increasing slope for an increasing positive input signal as well as providing for a function having increasing and decreasing slopes for a negative going signal.

To create an output signal segment having a positive slope for an increasing positive signal, the particular diode employed in the generation of that segment is reversed in polarity with its cathode connected through the input resistance to the input terminal and also coupled to a positive reference voltage bias and also the input signal is inverted in polarity. To generate an output signal segment which would be positive going for a negatively going input signal, the respective diode or unidirectional element is oriented with its cathode coupled to the input signal and to a positive reference voltage bias without any input signal inversion and to obtain a negative going output signal for a negative going input signal, the respective diode or unidirectional element is oriented with its anode coupled to the input signal and to a negative voltage bias with the input signal first being inverted.

For a bettter understanding of the various circuit features required in a general purpose function generator, reference is now made to FIGURE 3 which is an illustration of an arbitrary function to be generated throughout all four quadrants of the graph co-ordinants. As distinct from the meaning of the word "quadrant" as it was just used, this word will henceforth be used to designate the following characteristics of the slopes of the respective segments which go to make up the complete function:

Quadrant I segments are those segments which have a positively increasing slope for an increasing input signal;

Quadrant II segments are those segments which have a negatively going slope for a negatively going input signal;

Quadrant III segments are those segments which have a positively increasing slope for a negatively going input signal;

Quadrant IV segments are those segments which have a negatively going slope for a positively going input signal.

The various type segments are indicated in FIGURE 3. Provision can be made for generating each type of segment upon the proper choice of the orientation of the respective diode or unidirectional element, the polarity of the voltage bias source coupled thereto as well as whether the input signal is supplied directly to the diode or inverted before presentation to the diode. In addition to the choice of conditions that define the various segments which go to make up the complete function, it is also required for a general purpose diode function generator to be able to provide an initial function value for a zero voltage input signal, that is to say to provide the required voltage bias where the function crosses the ordinate at some point other than the origin of the co-ordinants. This value, referred to as "parallax," is indicated in FIGURE 3 as $F_0$. It is also necessary to make provision for providing the appropriate slope to that segment of the function which crosses the ordinate. This particular slope is generally referred to as the central slope.

More importantly, it is advantageous to provide for selection of the particular breakpoints that are involved in forming the complete function, that is to say that portions of the curve having great curvature require a large number of segments to form the curve while portions of the curve that are fairly linear may require only one or two segments. For example, in FIGURE 3, the portion of the curve between approximately $x$ equals +60 volts and $x$ equals +80 volts has a high degree of curvature and is illustrated as being formed of four different segments while the portion of the curve from approximately $x$ equals +20 to $x$ equals 60 volts is fairly linear and requires only two segments. The ability to select the particular breakpoints involved in forming these various segments as well as to provide for the selection of the other conditions necessary to define any given function will now be described.

Figure 4:
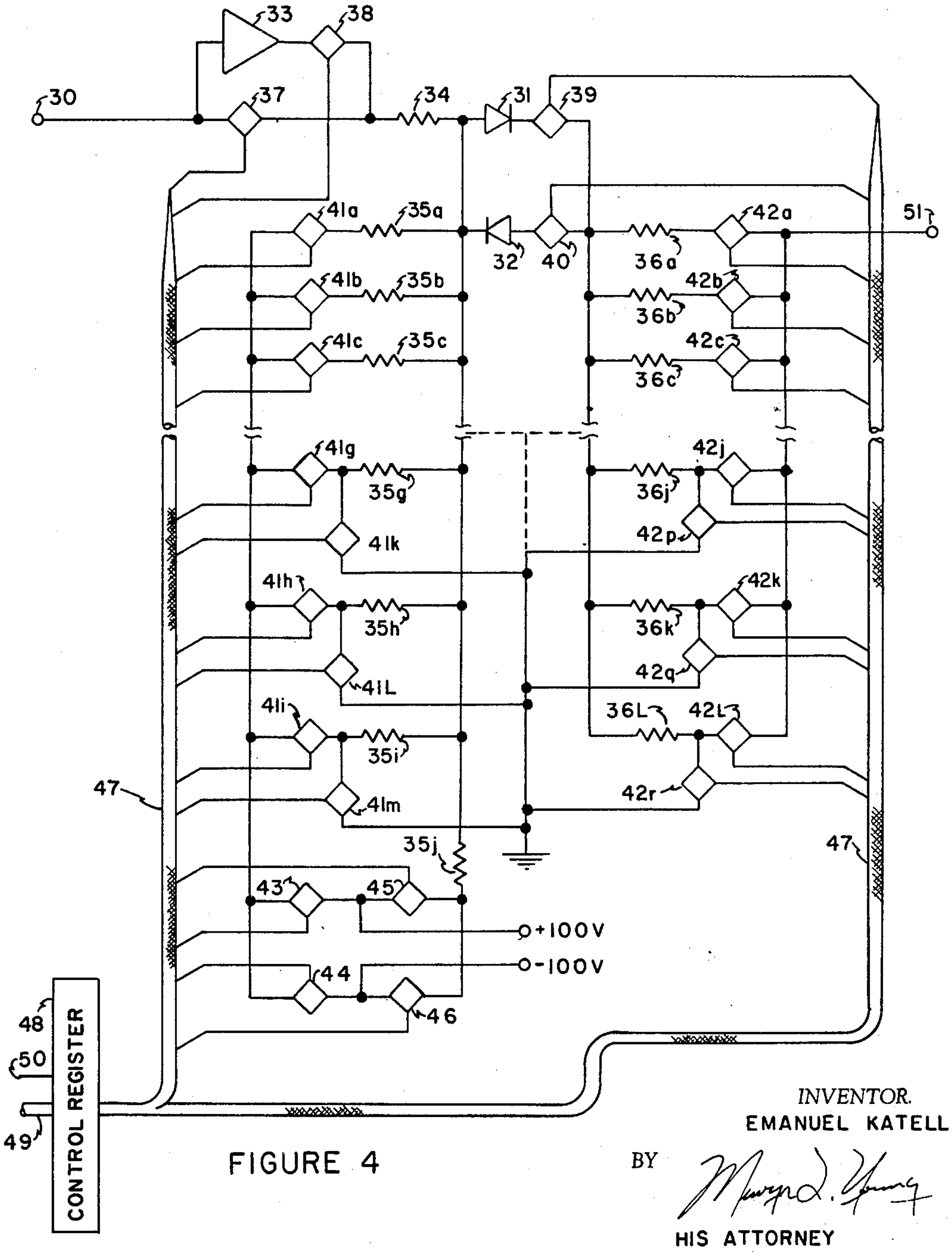
FIGURE 4 is a schematic diagram of one of the segment generating circuits as employed in the present invention.
Figures 6, 7, 8:
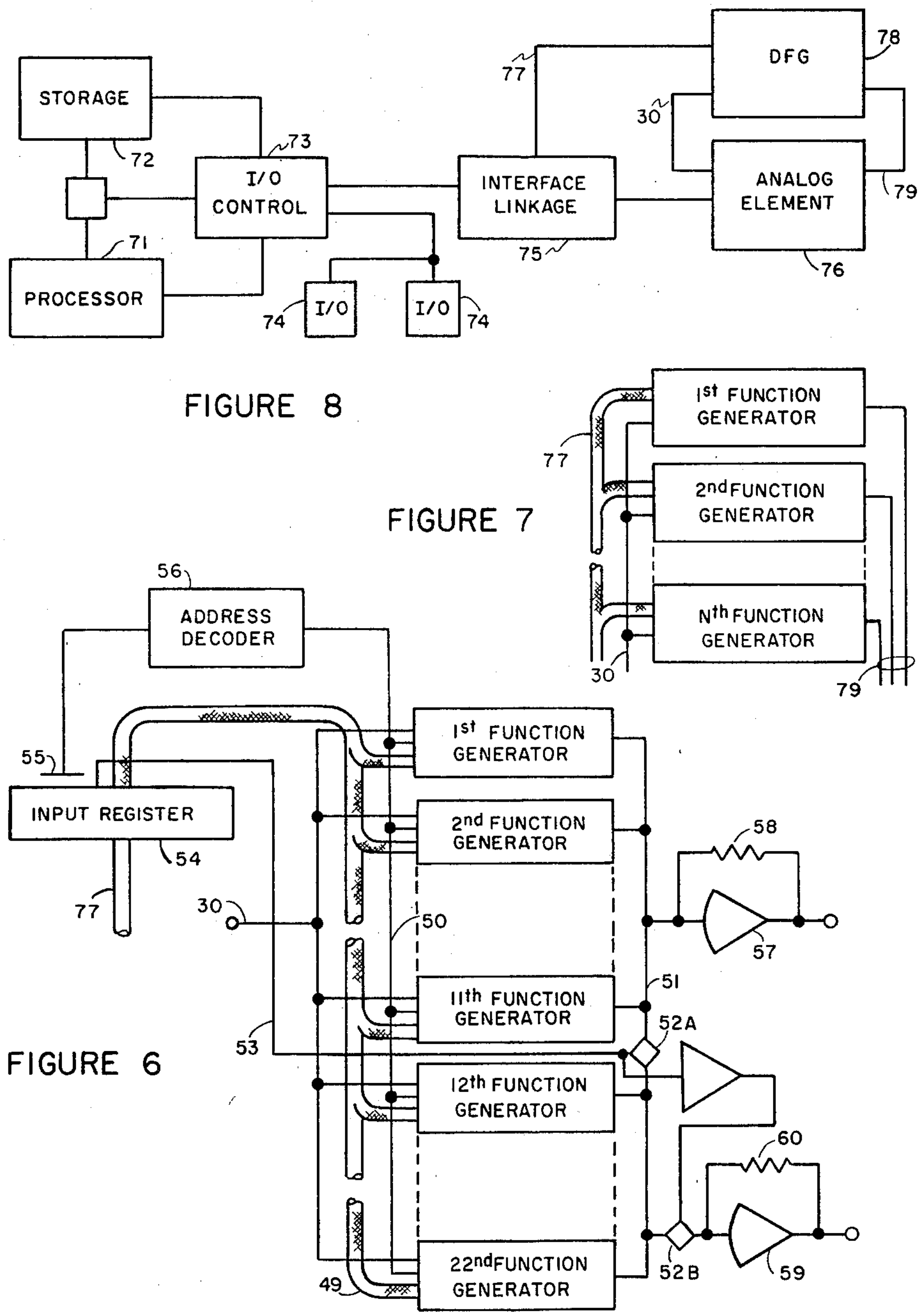
FIGURE 6 is a schematic diagram of an individual function generator of the present invention.
FIGURE 7 is a diagram of the control system to a plurality of function generators characteristic of the present invention.
FIGURE 8 is a schematic diagram of a hybrid analog digital system employing the present invention.

Referring now to FIGURE 4, there is shown therein a diode and resistance network which is adapted to provide all of the features required of a programable diode function generator. The circuitry of FIGURE 4 represents one segment branch of a complete diode function generator and is analogous to one of the diode resistance branches of the circuit shown in FIGURE 1. It will be understood that the output terminal 51 along with all of the output terminals of similar segment generators are coupled to an operational amplifier as illustrated in FIGURE 6 which will be further described below.

The segment generating network of FIGURE 4 is provided with diode 31 which is adapted to be placed in the circuit when electronic switch or gate 39 is conducting the diode 32 whtich is adapted to be placed in the circuit when gate 40 is conducting. The selection of a particular diode to be employed in this circuit depends upon that type of segment that is desired to be generated, that is to say, whether the segment is of the quadrant I, quadrant II, quadrant III, or quadrant IV type. The input signal to the selected diode is provided either directly by way of gate 37 and resistor 34 or the inverted form may be presented by invertor 33 by way of gate 38 and resistor 34, the selection between the signal itself or its inverted form being determined by the quadrant type of the segment to be generated.

Either a positive 100 volt bias source or a negative 100 volt bias source may be selected upon the conditioning for conductance of either gate 43 or gate 44 respectively and upon the selection of one or more of resistors 35*a* . . . 35*i* by the conditioning for conductance of the respective gates 41*a* . . . 41*i*. The resistive values of the respective resistances 35*a* . . . 35*i* are so chosen in relation to the value of the restistance 34 as to allow for the selection of any potential level for presentation to the junction between resistance 34 and the diodes in one volt steps from −100 volts to +100 volts. Thus, upon the selection of resistor 35*a*, a positive or negative one volt bias is supplied to the diodes depending upon whether the positive or negative bias source was selected as described above. Upon selection of resistor 35*b*, positive or negative two volt bias is presented to the diodes. Upon the selection of resistor 35*c*, a positive or negative four volt bias is presented to the diodes. Upon the selection of resistance 35*d* (not shown) a positive or negative eight volt bias is presented to the diodes and so on. The remaining resistors are so adapted to provide a 16 volt, 32 volt, and 36 volt bisa to the diodes. Thus, upon the proper selection of resistors, any integral value of potential bias between −100 volts and +100 volts can be applied to the junction between resistor 34 and the diodes to appropriately select the required breakpoint voltage level at which the diodes are to begin to conduct for the particular segment of the function being generated by this segment generator circuit. It will be remembered that a complete function generator can be made up of 10 to 20 of the segment generators as illustrated in FIGURE 4 and this will be more thoroughly described below.

In addition to providing for the connection of the respective resistances 35*a* . . . 35*i* to a bias voltage source, the values of these resistances have been so chosen that when they are not coupled between the bias source and the respective diodes, they are to be grounded and to this end gates 41*k* . . . 41*m* are so provided.

A particular feature of the present invention not heretofore mentioned is the provision of a bleeding current to the bias resistances described above that is in opposition to the bias voltage applied to those resistances for the purpose of off-setting certain non-linearities in the segment generation such that the segment will be linear in its extrapolation to the theoretical breakpoint. For this purpose, the respective bias sources are also coupled through gates 45 and 46 to the resistor 35*j* which is an extremely high valued resistor such that when the positive 100 volt source is coupled to the diodes by gate 43, the negative 100 volt bias source will be coupled through resistor 35*j* by way of gate 46 to provide this small opposing bleeding current. Similarly, when the negative bias voltage source is coupled to the diodes by way of gate 44, the positive bias source is to be coupled to resistor 35*j* by way of gate 45.

It will be remembered from the discussion of FIGURE 1 that the slope of the respective segments is determined by the ratio of the feedback resistance 20 of amplifier 21 to the resistance of the particular resistor in series with the particular diode forming that segment. To provide an analogous resistance in FIGURE 4, there are provide resistors 36*a* . . . 36L which may be selectively coupled in parallel and which have values so chosen in relation to the feedback resistance of corresponding operational amplifier to be discussed below as to provide for the selection of different slopes for the segment being generated in increments of 1 millivolt per volt from 0 to 4.095 volts per volt, it being remembered that the function being generated as well as the input signal which is the independent variable thereof are both measured in terms of volts. If greater slopes than 4.095 volts per volt are required, the input signal may be multiplied by an appropriate factor before presentation to function generator, the output signal may be multiplied by a change of feedback impedance or two or more diode segments may be caused to conduct at the same breakpoint, their slopes being additive.

The respective resistors 36*a* . . . 36*l*, may be selected individually or in combination for parallel connection between either of diodes 31 or 32 and output terminal 51 which connects to the operational amplifier as will be described below. Each resistor is selected by placing in conductance the respective gates 42*a* . . . 42*l*, thus, if it is desired to provide a slope of 1 millivolt per volt, resistor 36*a* is coupled to output terminal 51 by placing in conductance of gate 42*a*. If it desired to provide a slope 2 millivolts per volt, resistor 36*b* is coupled to output terminal 51 by placing in conductance of gate 42*b*. The contribution to the segment slope of resistors 36*c* . . . 36L are respectively 4, 8, 16, 32, 64, 128, 256, 512, 1024, and 2048 millivolts per volt. As in the case of the biasing resistors 35*e* . . . 35*i*, the values of resistors 36*g* . . . 36L are so chosen in relation to the resistance of the feedback path of the amplifier that, when these particular resistors are not placed in circuit with the amplifier, they are to be grounded by the placing in conductance of the respective gates 42*m* . . . 42*r*.

The circuitry of FIGURE 4 thus described can be adapted to generate the segment of any quadrant type upon the application of the appropriate control signals to the respective gates described above. When the particular segment generator has been selected, the corresponding control signals are applied to control register 48 of FIGURE 4 with the respective bit positions remaining set during the operation of the circuitry to provide the respective signals to the different gates by way of control bus 47. When it is desired to change the configuration to produce a new segment, different set of control signals are then applied to register 48 thus resetting the circuitry.

Figure 5:
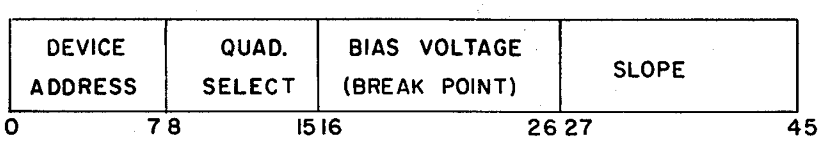
FIGURE 5 illustrates the format of a digital signal control word as employed in the present invention.

Before describing the control word format as illustrated in FIGURE 5, reference will now be made to FIGURE 6 which illustrates the organization of a single function generator made up of a plurality of segment generators of the type described in reference to FIGURE 4. As illustrated in FIGURE 6, a single function generator is made up of plurality of segment generators to generate either one function having 20 segments or two functions having 10 segments. In FIGURE 6 however, there are shown to be 22 segment generators where the first segment generator and the 12th segment generator are slightly different from the circuitry illustrated in FIGURE 4 and are adapted to provide for parallax and central slope adjustment as was briefly described above and will be more thoroughly described in detail below. The output terminals 51 of each of the respective segment generators 1 through 11 are coupled to the input terminal of operational amplifier 57 having resistor 58 in feedback relation therewith. It will be remembered from the discussion of FIGURE 4 that the value of resistance 58 is of importance in that it is the ratio of this value to the collective values of the selected resistances 36*a* . . . 36L which determine the particular slope of the segment being generated by the particular segment generator.

Similarly, the output terminals 51 of the respective segment generators 12–22 are coupled to the input terminal of operational amplifier 59 having resistor 60 in the feedback path relation therewith. When it is desired to employ all segment generators to generate a given function, all of the output terminals of the respective generators are coupled to operational amplifier 57 by the placing in conductance of gate 52A as shown in FIGURE 6 and operational amplifier 59 is disconnected by an inverted signal supplied to gate 52B.

Having briefly described the overall organization of the function generator, the control word format as illustrated in FIGURE 5 will now be described. The control word is essentially formed of four fields which are the device address field, the quadrant select field, the breakpoint bias voltage field, and the slope field. The device address field is provided with a sufficient number of bits as to be able to designate each segment generator of each function generator employed in the system and is illustrated in FIGURE 5 as including bit positions 0–7. As indicated in FIGURE 6, it is this field which when presented to input register 54 is detected by circuit leads 55 for presentation of the address decoder 56 which in turn selects the particular control register 48 of the selected segment generator for which the control word is adapted with the control word being presented over bus 49 to that control register, as indicated in FIGURE 4. The quadrant select field is an 8 bit field comprising bits 8–15 with the control register 48 of FIGURE 4 being so adapted as to activate the respective gates in response thereto as required for the particular selection of the diode orientation, signal inversion and voltage bias sign as required to determine the quadrant type of the segment to be generated. Thus, a bit appearing in bit position 8 would result in placing of gate 39 in FIGURE 4 in conductance to select the diode orientation of diode 31 while a bit in bit position 9 would serve to activate gate 40 to select the diode orientation of diode 32 as illustrated in FIGURE 4. Similarly, the bit in bit position 10 of the control word format will serve to activate gate 37 for presentation of the input signal directly to the diode network while a bit in bit position 11 will serve to activate gate 38 to provide the inverse of the input signal to the diode network. The existence of a bit in bit position 12 serves to activate gate 43 to connect the positive bias voltage source to the bias resistance network while the bit in bit position 13 serves to activate gate 44 to connect the negative voltage source to the bias resistance network. It will be remembered that when the positive bias source is connected to the bias resistance network, the negative bias source is connected to bleeder resistor 35*j* and vice versa and to this end, a bit in bit position 14 will serve to activate gate 46 to connect the negative voltage bias source to resistor 35*j* while a bit in bit position 15 will serve to activate gate 45 to connect the positive voltage bias source to bleeder resistor 35*j*.

The bias voltage field consists of 11 bits including bit positions 16–26 which are adapted to activate the respective gates 41*a* . . . 41*m* that were described above in reference to FIGURE 4. Similarly, the slope field consists of 19 bits and includes bit positions 27–45 which are adapted to activate the respective gates 42*a* . . . 42*r* that were also described in reference to FIGURE 4.

This control word format will therefore serve to set up each of the various segment generators which are all of the form illustrated in FIGURE 4 with the exception of the first segment generator and the 12th segment generator that are adapted to provide the parallax voltage bias and central slope. The first segment generator and the 12th segment generator will be similar to the circuitry of FIGURE 4 with the exception that diodes 31 and 32 as well as gates 39 and 40 are iluminated with a direct connection being provided between resistor 34 and resistor 36*a*. In this manner, the voltage bias supplied by way of resistors 35*a* . . . 35*i* now serve to provide the initial voltage bias $F_0$ (see FIGURE 3) while the network of resistors 36*a* . . . 36L serve to provide the slope of the segment crossing the ordinate as illustrated in FIGURE 3. To this end, there will be a modification of the quadrant select field in the control word provided to the first and 12th segment generators since only two bits need be provided to indicate whether the parallax bias is positive or negative and bit positions 8 and 9 will provide this information. Bit position 13 is now employed to indicate whether or not 10 segments or 20 segments are to be employed in the function generation and the existence of a bit in this bit position serves to place gate 52A of FIGURE 6 in conductance and gate 52B is opened.

It will be appreciated that a plurality of such function generators as thus described may be employed in the system, the only requirement on the control word format being that the address field be sufficiently large to address each segment generator of each function generator. A schematic illustration of the organization of such plurality of such function generators is given in FIGURE 7 which illustrates the control bus 77 coupled to the individual function generators as well as respective interconnection required to couple the function generators to the analog element which is the source of input signal.

As thus described, the present invention may include a plurality of function generators each of which may be set up to provide as an output signal any given function made up of a plurality of segments, the slopes and breakpoints of which may be automatically selected by the respective digital signals that go to make up the control word. It will be appreciated that this control word may be supplied from a digital computer as would be the case when the function generator of the present invention is employed in a hybrid digital analog system. As an alternative the control information may be supplied from a punch card read by a static punch card reader in which case all the respective control words required for the respective segment generators would be placed on one card for simultaneous reading thereof and simultaneous setting up of the respective segment generators.

A general organizational schematic of a hybrid computer of the type adapted to employ the present invention is illustrated in FIGURE 8 and includes a central processor 71 in communication with a core or other type storage 72 which is coupled to I/O control unit 73 that would, in a normal data processing system control the input-output transfer between storage 72 and a plurality of tape or other I/O devices 74. I/O control unit 73 is also connected for communication with analog element 76 by means of interface linkage unit 75 and by control data bus 77 to diode function generator 78 which is of the type that has been described above. Diode function generator 78 is also connected to the plug board of analog element 76 by signal bus 79 which serves to provide the appropriate input signals from analog element 76 to the respective segment generators of diode function generator 78 as well as to transfer the generated function signals back to analog element 76. With the system thus described, the user or programmer can arrange the particular control words necessary for the function generator in advance and supply them as by magnetic tape to storage 72 for later transfer to diode function generator 78 in accordance with the control program being sequenced by the digital portion of the hybrid system, that is, by processor 71. In more elaborate computational processes, it may be desirable to have a program stored in storage 72 for implementation by processor 21 to generate the required control words in dependance upon other computations being processed by the system.

Interface linkage unit 75 may be of a type described and claimed in the co-pending application to Baumann et al., Ser. No. 334,107, filed Dec. 30, 1963, and assigned to the assignee of the present application. However, it will be appreciated that the Baumann et al. system is not adapted for employment with a diode function generator and thus would have to be provided with connection between its data bus and data bus 77 as illustrated in FIGURE 8.

It will be apparent to one skilled in the art that the above described embodiments may be modified. For example, the diode elements may be replaced by other unidirectional devices such as field effect transistors appropriately placed in circuit and the electronic switches or gates may be of any known type and even electromechanical relays. Furthermore, the 100 volt reference sources may be replaced by a variable voltage source such as might be employed when a function is to be generated as dependent on two or more variables. Thus, variations and modifications are to be considered within the spirit and scope of the invention as claimed.

What is claimed is:

1. A diode function generator comprising:

an operational amplifier;

at least one segment network having an output terminal coupled to said amplifier and an input terminal;

a pair of oppositely poled unidirectional elements selectively connected between said input terminal and said output terminal;

bias means including a plurality of resistors and a voltage reference source selectively connected between said input terminal and said selected unidirectional element to provide a selected voltage bias to said unidirectional element;

impedance means including a plurality resistors selectively connected between said selected unidirectional element and said output terminal to provide a selected impedance to said amplifier; and control means including a source of digital signals coupled to said bias means and to said impedance means for selecting said bias means and said impedance resistors.

References Cited

UNITED STATES PATENTS

| | | | |
|---|---|---|---|
| 3,080,555 | 3/1963 | Vadus et al. ---- | 235—150.53 X |
| 3,110,802 | 11/1963 | Ingham et al. ----- | 235—150.53 |
| 3,185,827 | 5/1965 | Herndon -------- | 235—150.53 X |
| 3,250,905 | 5/1966 | Schroeder et al. - | 235—150.53 X |
| 3,339,063 | 8/1967 | Norsworthy ---- | 235—150.53 X |

MALCOLM A. MORRISON, Primary Examiner

J. F. RUGGIERO, Assistant Examiner

U.S. Cl. X.R.

235—197; 307—229